(12) United States Patent
Roper et al.

(10) Patent No.: US 12,264,699 B2
(45) Date of Patent: Apr. 1, 2025

(54) ATTACHMENT OF IGNITION SUPPRESSION OR QUENCHING DEVICE TO A FASTENER STACK

(71) Applicant: The Boeing Company, Chicago, IL (US)

(72) Inventors: Christopher S. Roper, Oak Park, CA (US); Mark R. O'Masta, Oak Park, CA (US); Haftom Y. Dessalegn, Mountlake Terrace, WA (US)

(73) Assignee: The Boeing Company, Arlington, VA (US)

( * ) Notice: Subject to any disclaimer, the term of this patent is extended or adjusted under 35 U.S.C. 154(b) by 623 days.

(21) Appl. No.: 17/466,088

(22) Filed: Sep. 3, 2021

(65) Prior Publication Data

US 2022/0220995 A1 Jul. 14, 2022

Related U.S. Application Data

(60) Provisional application No. 63/136,882, filed on Jan. 13, 2021.

(51) Int. Cl.
| | |
|---|---|
| *F16B 37/14* | (2006.01) |
| *F16B 33/00* | (2006.01) |
| *B64D 37/32* | (2006.01) |
| *B64D 45/02* | (2006.01) |

(52) U.S. Cl.
CPC .......... *F16B 37/14* (2013.01); *F16B 33/004* (2013.01); *B64D 37/32* (2013.01); *B64D 45/02* (2013.01)

(58) Field of Classification Search
CPC ....... B64D 37/32; B64D 45/02; F16B 33/004; F16B 37/14
USPC ..................................... 411/67, 374
See application file for complete search history.

(56) References Cited

U.S. PATENT DOCUMENTS

| | | | |
|---|---|---|---|
| 4,519,974 A | 5/1985 | Bravenac et al. | |
| 4,826,380 A | 5/1989 | Henry | |
| 5,197,720 A * | 3/1993 | Renz ...................... | B23B 31/117 269/48.1 |
| 5,366,331 A * | 11/1994 | Erbes ...................... | F16B 39/10 411/909 |
| 5,791,847 A * | 8/1998 | Keto-Tokoi ............. | F16B 43/00 411/909 |
| 8,711,541 B2 * | 4/2014 | Umemoto .............. | B64D 45/02 361/218 |
| 9,611,052 B2 | 4/2017 | Whitlock et al. | |
| 10,051,767 B2 | 8/2018 | Yoon et al. | |
| 10,501,202 B2 * | 12/2019 | Roper ...................... | F16B 5/02 |
| 10,655,667 B2 | 5/2020 | Stevens et al. | |
| 2004/0109737 A1 * | 6/2004 | Kato ...................... | F16B 19/008 411/55 |

(Continued)

FOREIGN PATENT DOCUMENTS

| | | | | |
|---|---|---|---|---|
| CA | 3004975 A1 * | 2/2019 | .............. | A62C 3/04 |
| CA | 3053378 A1 * | 3/2020 | .............. | A62C 3/08 |

(Continued)

*Primary Examiner* — William D Hutton, Jr.

(57) ABSTRACT

A device which is attachable to a fastener stack, the device comprising: an attachment element made of shape memory material; and a cap comprising a base having an aperture and a shell having an interior space in fluid communication with the opening, wherein the base supports the shell and is coupled to the attachment element.

23 Claims, 7 Drawing Sheets

(56) References Cited

U.S. PATENT DOCUMENTS

| | | | |
|---|---|---|---|
| 2006/0145016 A1* | 7/2006 | Renfro | B64G 1/64 244/158.1 |
| 2010/0277849 A1 | 11/2010 | Morrill et al. | |
| 2020/0080584 A1 | 3/2020 | Roper et al. | |

FOREIGN PATENT DOCUMENTS

| | | | | |
|---|---|---|---|---|
| GB | 2523125 A | * | 8/2015 | B21D 39/00 |
| WO | WO-2014118117 A1 | * | 8/2014 | B64D 37/32 |

* cited by examiner

ATTACHMENT OF IGNITION SUPPRESSION OR QUENCHING DEVICE TO A FASTENER STACK

RELATED PATENT APPLICATION

This application claims the benefit, under Title 35, United States Code, Section 119(e), of U.S. Provisional Application No. 63/136,882 filed on Jan. 13, 2021.

BACKGROUND

The present disclosure relates generally to devices and methods for suppressing or quenching ignition and, more specifically, to a cover and methods of attaching the cover over a fastener stack to suppress or quench ignition.

As used herein, the term "fastener stack" means a fastener assembly comprising one fastener (e.g., bolt, stud, or pin), one or more mating parts (e.g., nuts or swaged collars), and optionally one or more washers (e.g., the fastener stack may have zero washers). The fastener may include a mating portion having external projections, such as helical threads or annular rings, while the mating part has internal projections which engage the external projections after the mating part has been tightened or swaged. Optionally, the fastener may further include a transition portion disposed between the shank and the mating portion. Fasteners are typically made from metal (e.g., stainless steel, titanium). The fastener stack typically joins two or more plates having respective holes which are aligned. The fastener from the fastener stack is positioned through the aligned holes. The washers (if present) are adjacent to and in contact with respective plates. The plate material may be metal, polymer, ceramic, or composite (e.g., fiber-reinforced plastic).

Separation of the fastener stack is often undesirable and various strategies are employed (e.g., a lock washer, adhesive, etc.) As one example, during a lightning strike on an aircraft, a high electrical current propagates through conductive paths on the aircraft. Due to the non-isotropic electrical conduction which occurs in composite materials used in modern aircraft designs and potentially poor electrical connection at panel interfaces, in order for the current to travel from one composite panel to another, lightning-induced current may pass through a fastener stack. While passing through a fastener stack, the current may damage the fastener stack and surrounding structure.

Various technologies have been developed that impart lightning protection to a fastener stack, including quenching caps, caps with internal sealed volumes, seal nuts, and seal washers. For example, hot particles may form in the space under the cap as a result of the lightning strike. However, typical solutions require a change to the fastener stack, an adhesive bond, or both.

SUMMARY

The subject matter disclosed in detail below is directed to ignition suppression devices and ignition quenching devices (collectively referred to hereinafter as "devices").

Although various embodiments of devices attached to fastener stacks using shape memory material are described in some detail below, one or more of those embodiments may be characterized by one or more of the following aspects.

One aspect of the subject matter disclosed in detail below is a device which is attachable to a fastener stack, the device comprising: an attachment element made of shape memory material; and a cap comprising a base having an aperture and a shell having an interior space in fluid communication with the opening, wherein the base supports the shell and is coupled to the attachment element.

Other aspects of ignition suppression/quenching devices attached to fastener stacks using shape memory material are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams are drawn to scale.

In the appended assembly drawings, various components which extend 360 degrees around a fastener are shown in section without hatching to avoid clutter. Also, the external projections of the mating portion of the fastener and the internal projections of the mating part (e.g., nut or collar) are not shown.

Reference will hereinafter be made to the drawings in which similar elements in different drawings bear the same reference numerals.

DETAILED DESCRIPTION

For the purpose of illustration, ignition suppression devices and ignition quenching devices attached to fastener stacks using shape memory material will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The illustrative embodiments presented recognize and take into account that fastener systems may be exposed to voltages and currents induced by an electromagnetic event such as lightning. It is desirable to control an electrical current or discharge that may be caused by an electromagnetic event. As an example, it is desirable to inhibit an electrical current or discharge caused by an electromagnetic event from igniting fuel or other flammable material in a storage tank.

The devices described below include an element for attaching the ignition suppression or ignition quenching device to a fastener stack. The attachment element is made of shape memory material. As used herein, the term "shape memory material" includes shape memory alloy (SMA) and shape memory polymer (SMP). A shape memory alloy is an alloy that can be deformed when cold but returns to its pre-deformed ("remembered") shape when heated. Some shape memory alloys produce a two-way shape-memory effect. A shape memory polymer is a polymeric material that has the ability to return from a deformed state (temporary shape) to their original state (permanent shape) induced by an external stimulus (trigger), such as temperature change.

In accordance with some embodiments, the attachment element is made of a shape memory alloy such as nickel-titanium alloy. In accordance with other embodiments, the attachment element is made of a shape memory polymer. By configuring the shape memory attachment element to shrink upon application of a stimulus, a radially compressive load can be placed upon a nut, washer(s), fastener head, and/or fastener external threads in a fastener stack. The compression may create either a cold-weld or a substantial frictional resistance to keep an ignition suppression device or an ignition quenching device in place over a fastener stack. For example, embodiments herein resist separation of the fastener stack to reduce or eliminate dielectric breakdown of the ambient air (e.g., to prevent a spark).

Figure 1:
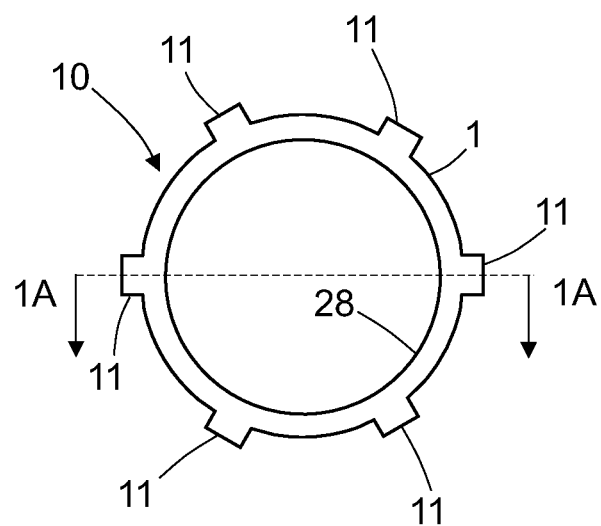
FIG. 1 is a diagram representing a top view of a shape memory attachment element in the form of a tabbed circular ring made of shape memory material in accordance with one embodiment.
Figure 1A:
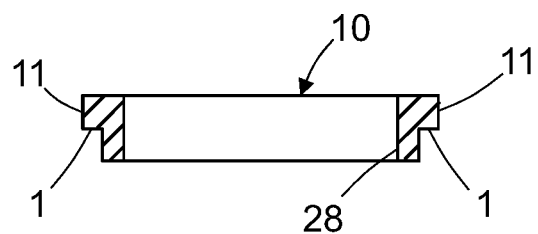
FIG. 1A is a diagram representing a sectional view (with hatching) of the shape memory attachment element depicted in FIG. 1, the section being taken along a plane indicated by the dashed line 1A-1A in FIG. 1.

FIG. 1 shows a top view of an attachment element made of shape memory material (hereinafter "shape memory attachment element 10") in accordance with one embodiment. FIG. 1A is a sectional view of shape memory attachment element 10, the section being taken along a plane indicated by the dashed line 1A-1A in FIG. 1. As best seen in FIG. 1, the shape memory attachment element 10 is in the form of a circular ring 1 having an aperture 28 which is sized to allow a projecting portion of a fastener stack to pass through.

The shape memory attachment element 10 further includes a plurality (e.g., six) of tabs 11 projecting radially outward from circular ring 1 at intervals (e.g., equiangular intervals). The tabs 11 may be integrally formed with and made of the same shape memory material as the circular ring 1. The tabs 11 are configured to project into respective slots formed in the base of an ignition-suppressing cap (not shown in FIG. 1), eventually reaching a relative position where the cap is twist-locked to the shape memory attachment element 10.

Figure 2A:
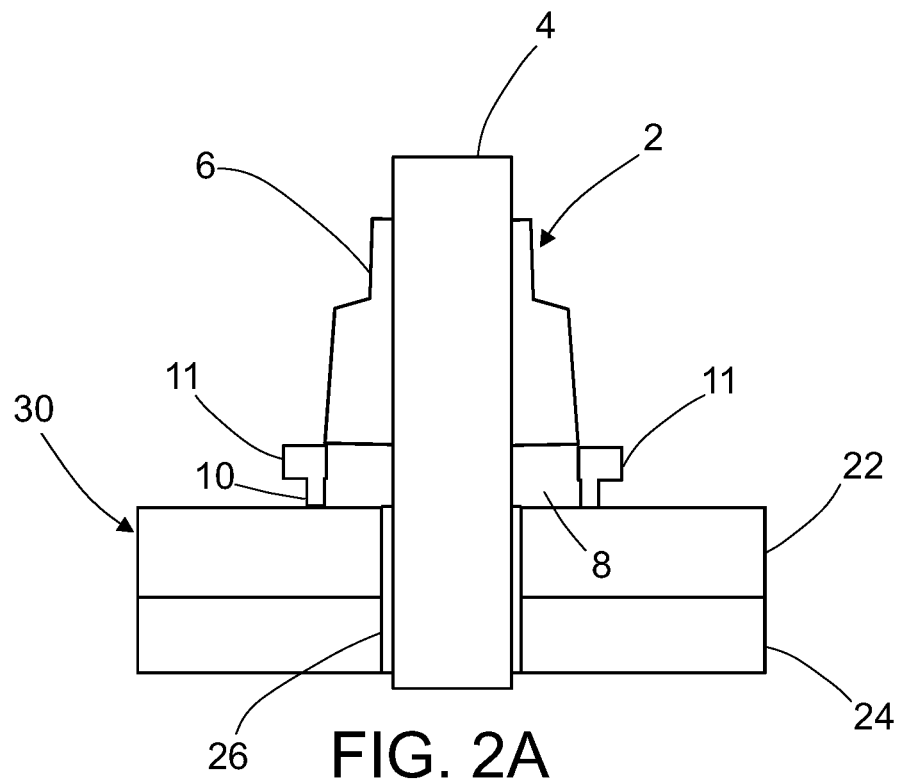
FIG. 2A is a diagram representing a sectional view (without hatching) of the shape memory attachment element depicted in FIG. 1 attached to a fastener stack.

FIG. 2A shows a sectional view of a shape memory attachment element 10 (of the type depicted in FIGS. 1 and 1A) attached to a fastener stack 2. The portions of fastener stack 2 depicted in FIG. 2A include a fastener 4 and a mating part 6. The fastener 4 passes through a hole 26 in a support structure 30 comprising a pair of plates 22 and 24, which are thus fastened together. The plates 22 and 24 have respective holes of equal diameter which are aligned to form hole 26 in support structure 30.

The support structure 30 with fastener stack 2 may be installed in a structure such that the volume of space above plate 22 may include a combustible environment. For example, the combustible environment may include a fuel (e.g., hydrogen, gaseous, liquid, and/or aerosolized hydrocarbon, and/or suspended particulate such as sawdust, etc.), an oxidizer (e.g., oxygen, fluorine, and/or nitrous oxide), and optionally a non-reactive diluent (e.g., nitrogen, argon, and/or helium) with concentrations within the flammability limits of the fuel/oxidizer mixture. As another example, the combustible environment may include a gas that undergoes explosive decomposition (e.g., acetylene, nitrous oxide). Additional specific examples of fuels include motor fuels such as automotive fuel, diesel fuel, aviation fuel, and/or jet fuel. The combustible environment may include gases, vapors, aerosols, and/or particulate.

If the installed fastener stack 2 were left uncovered, the portion of fastener stack 2 which projects above the support structure 30 would be exposed to the combustible environment. The fastener stack 2 includes metal and/or conductive components that could shunt electrical current and/or be associated with electromagnetic effects that may become ignition sources. For example, the fastener stack 2 may be subject to electromagnetic effects that may produce arcing at the fastener stack 2. Protection against such ignition may be provided by covering the projecting portions of fastener stack 2 with a cap 12 shown in FIG. 2B.

Still referring to FIG. 2A, the fastener 4 comprises a mating portion having external projections (not shown in FIG. 2A). The mating part 6 has internal projections (not shown in FIG. 2A) that are interengaged with the external projections of the mating portion of the fastener 4. The fastener stack 2 depicted in FIG. 2A further includes a washer 8 that surrounds a portion of the fastener 4. The shape memory attachment element 10 is shown in a compressed state attached to the washer 8. In the scenario depicted in FIG. 2A, the unthreaded shank of fastener 2 passes through hole 26 in support structure 30. The washer 8 is disposed between the plate 22 and the mating part 6.

The plate material may be metal, polymer, ceramic, or composite (e.g., fiber-reinforced plastic). For example, plate 22 may be a wall of an aircraft fuel tank, which wall is made of carbon fiber reinforced plastic. FIG. 2A shows mating part 6 and washer 8 (and a portion of fastener 4) on the inside of the fuel tank. Other fastener stack elements (not shown in FIG. 2A) involved in the fastening of plates 22 and 24 are disposed outside the fuel tank (such as the head of a bolt if fastener 4 is a bolt). (Nor are such other fastener stack elements shown in FIGS. 2B, 3A, 3B, 4B, and 5B.)

The shape memory attachment element 10 is configured so that in a pre-stimulus state, the shape memory attachment element 10 is adjacent to the fastener stack 2 along at least a portion of a periphery of the fastener stack 2, whereas in a post-stimulus state (depicted in FIG. 2A), the shape memory attachment element 10 is compressed onto and in contact with (attached to) the fastener stack 2. More specifically, the aperture 28 of shape memory attachment element 10 shrinks in response to a stimulus, and thus the shape memory attachment element 10 clamps onto part of the fastener stack.

In the example depicted in FIG. 2A, the shape memory attachment element 10 is clamped onto washer 8. In alternative implementations, the shape memory attachment element 10 may clamp onto part or all of a bolt head, exposed threads of a bolt, more than one washer, and/or a nut. The clamping may provide a frictional force to keep the ignition suppression device (shown in its entirety in FIG. 2B described below) affixed to the fastener stack 2. The clamping may cold weld part or all of shape memory attachment element 10 to a portion of the fastener stack 2. In one proposed implementation, the stimulus is a change in temperature, preferably an increase in temperature.

The shape memory attachment element 10 may also include other materials. For example, a shape memory alloy ring may be mechanically connected to a polymer ring. Additionally or alternatively, a shape memory alloy ring may be coated with another material for one or more of the following purposes: (a) corrosion protection; (b) to assist in cold welding; (c) to increase frictional force between the attachment portion and the fastener stack; and (d) to facilitate attachment to a base seal portion, containment portion, and/or porous material portion of an ignition suppression device or a or ignition quenching device.

Figure 2B:
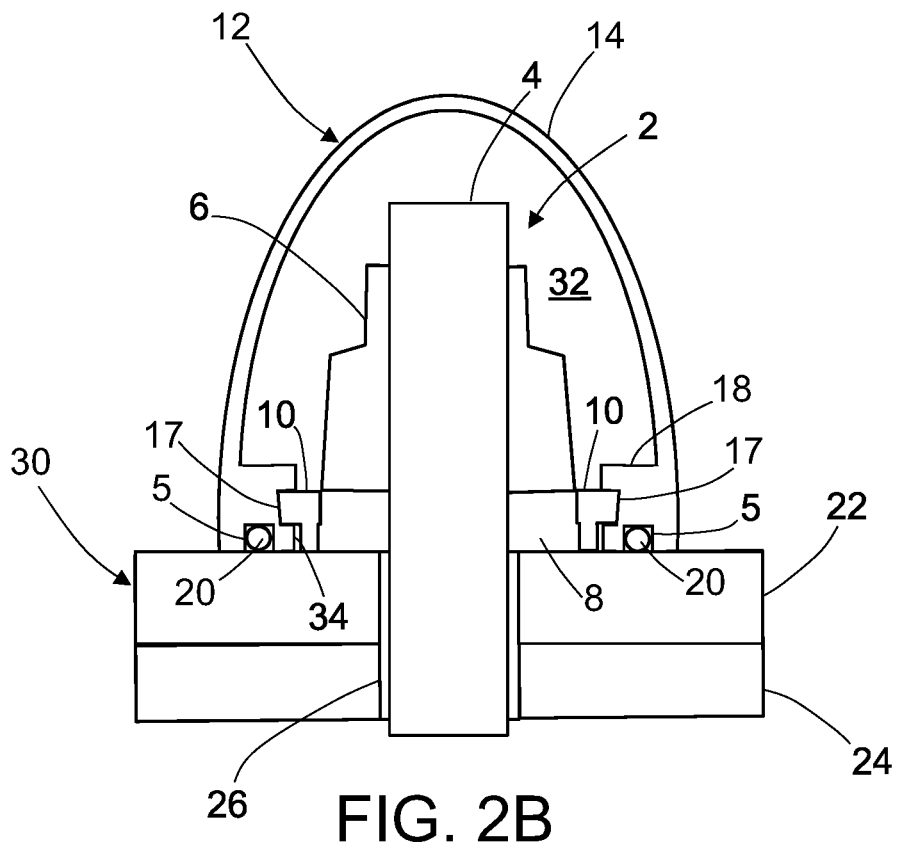
FIG. 2B is a diagram representing a sectional view (without hatching) of an ignition suppression cap sealed to a plate depicted in FIG. 2A and attached to the shape memory attachment element depicted in FIG. 2A.

Following attachment of shape memory attachment element 10 to fastener stack 2, a cap 12 is coupled to the shape memory attachment element 10 by twist-locking, as depicted in FIG. 2B. When assembled in an ignition-suppressing system, the cap 12 and fastener 2 are co-located at the fastener site, with the cap 12 covering and/or enclosing the fastener stack 2. The cap 12 and fastener stack 2 may be axisymmetric about an axis of the fastener stack 2 and perpendicular to a local plane of the support structure 30. Hence, the schematic view of FIG. 2B represents a cross-sectional view of the ignition suppression system.

As seen in FIG. 2B, the cap 12 is configured to provide a containment portion that covers the portion of fastener stack 2 that projects above plate 22 (hereinafter "projecting portion"). The cap 12 is configured to define an open volume 32 between the cap 12 and the projecting portion of the fastener stack 2. In accordance with some embodiments, the cap 12, when combined with other elements (e.g., base seal 20) of the ignition suppression device, hermetically seals the open volume 32 from the combustible environment inside the fuel tank. During a lightning strike event, if hot particles or hot gases are ejected from or near the fastener stack 2, they will be contained within the open volume 32 and will be isolated from the combustible environment inside the fuel tank. In accordance with other embodiments, the cap 12 may have a porous region so that the cap performs a quenching function.

In the example depicted in FIG. 2B, the cap 12 includes a base 18 having an opening 34 and a shell 14 having an interior space 32 in fluid communication with the opening 34 in base 18. The shell 14 and base 18 may be integrally formed and made of the same material or may be made of different materials and attached to each other by adhesive bonding, mechanical coupling, etc. The base 18 is in contact with plate 22, is coupled to shape memory attachment element 10, and supports shell 14 in a position such that the interior space 32 of shell 14 is partially occupied by a portion of the fastener stack 2. The base 18 is configured with retention slots 17 which receive and retain respective tabs 11 of shape memory attachment element 10.

FIG. 2B illustrates an example of an ignition suppression system in which the cap 12 is mechanically coupled to shape memory attachment element 10 by a twist-lock mechanism. The cap 12 may be coupled to shape memory attachment element 10 by placing the cap 12 over the fastener stack 2 and by twisting cap 12 relative to fastener stack 2 a small fraction of a turn (typically about one eighth of a turn).

As previously described, the shape memory attachment element 10 includes the cap attachment features, specifically, a series of radially projecting tabs 11. The attachment structure of cap 12 includes a plurality of entry slots (not shown in FIG. 2B, but see U.S. Pat. No. 10,501,202) formed in the base 18 of cap 12. The tabs 11 and the entry slots are configured to fit together such that cap 12 may be applied over the fastener stack 2 after the fastener stack 2 is installed in the support structure 30.

The entry slots are connected to locking ramps and then to retention slots 17. The locking ramps are configured to guide the tabs 11 from the entry slots to retention slots 17. Hence, the cap 12 may be installed with tabs 11 in the entry slots 162. A twist of the ignition-quenching cap 12 causes the tabs 11 to be driven up respective locking ramps (not shown in FIG. 2B, but see U.S. Pat. No. 10,501,202 or U.S. Patent Application Publ. No. 2020/0080584) until tabs 11 clear the locking ramps. Once tabs 11 have cleared the locking ramps, tabs 11 may snap into the retention slots 17. A height differential between the locking ramps and the retention slots 17 traps the tabs 11 in the retention slots 17 (or at least more force may be required to remove the ignition-quenching cap 12 than to install it).

The locking features help to keep the cap 12 in place at the fastener site and to resist dislodgement due to vibration and/or environmental perturbations. The cap 12 may have external features to facilitate twisting the cap 12 (applying torque) to lock the tabs 11 in the retention slots 17. The external features may be configured to accept a socket wrench.

The example shape memory attachment element 10 depicted in FIG. 1 has six tabs 11, and the cap 12 has six retention slots 17. However, the number of tabs may be different than six in alternative implementations. Furthermore, tabs 11 may be circumferentially distributed substantially uniformly (as shown in FIG. 1) or asymmetrically.

In an alternative embodiment, the cap 12 is coupled to the shape memory attachment element 10 by threadably coupling internal threads of the cap 12 with external threads formed on shape memory attachment element 10. A device comprising a cap 12 threadably coupled to a shape memory attachment element 10 will be described in some detail below in the context of an ignition quenching device having a porous cap, but threadably coupling is equally applicable to a non-porous cap.

The ignition suppression device depicted in FIG. 2B further includes a base seal 20 seated in an annular groove 5 formed in a bottom surface of the base 18 of cap 12. The base seal 20 is configured to compress when the bottom surface of base 18 is in contact with plate 22, thereby sealing the open volume 32 under cap 12. The base seal 20 may be an O-ring or a gasket. The gasket may be reversibly compressible (e.g., a foam gasket or a rubber gasket). In alternative implementations, the gasket may be irreversibly compressible. For example, the gasket may have a sharp edge that irreversibly deforms when pressed against the surface of plate 22. The sharp edge may be a knife edge. The gasket may be made of a polymer, preferably a thermoplastic. The polymer may be, e.g., polyamide, polyimide, polyamide-imide, polyether ether ketone (PEEK), polytetrafluoroethylene (PTFE), perfluoroalkoxy alkane (PFA), polyarylamide, or acetal.

The walls of groove 5 in base 18 may be made of a metal, polymer, ceramic, composite, etc. The groove 5 may have complete walls on both sides or may have a periodic wall on one or both sides. The groove 5 may have a dovetail to retain the base seal 20.

In accordance with an alternative embodiment, the bottom surface of base 18 may be sealed to plate 22 by means of an uncured or a cured adhesive or sealant (e.g., polysulfide sealant). In the case where cap 12 is non-porous, the base seal 20 preferably makes an airtight seal to the plate 22. As explained below, if the cap 12 includes a portion made of porous material, the base seal 20 is optional.

Figure 3A:
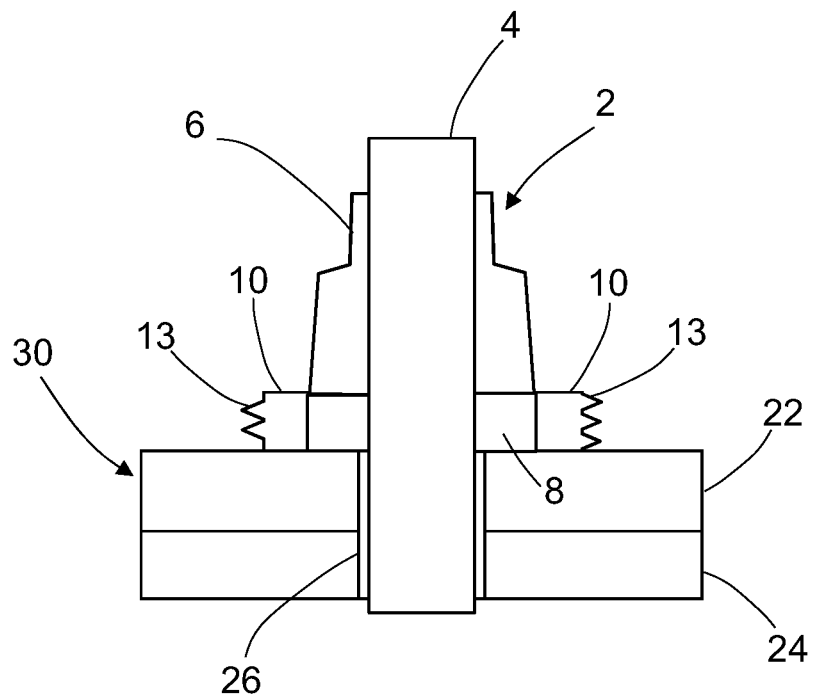
FIG. 3A is a diagram representing a sectional view (without hatching) of a shape memory attachment element that includes a circular ring (attached to a fastener stack) with external threads.

FIG. 3A shows a sectional view (without hatching) of a shape memory attachment element 10 in the form of a circular ring with external threads 13 in accordance with an alternative embodiment. The shape memory attachment element 10, in a post-stimulus state, is attached to a fastener stack 2. The only difference between the scenarios respectively depicted in FIGS. 2A and 3A is that in FIG. 2A, the shape memory attachment element 10 has tabs 11, whereas in FIG. 3A, shape memory attachment element 10 has external threads 13.

Figure 3B:
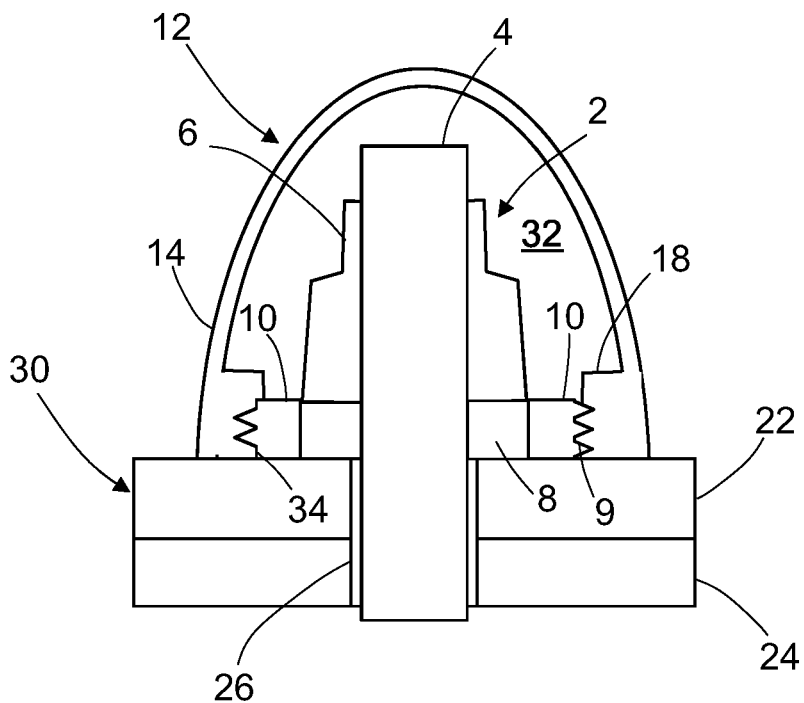
FIG. 3B is a diagram representing a sectional view (without hatching) of an ignition quenching cap sealed to a plate and threadably coupled to the externally threaded shape memory attachment element depicted in FIG. 3A.

Following attachment of shape memory attachment element 10 to fastener stack 2, a cap 12 is threadably coupled to the shape memory attachment element 10, as depicted in FIG. 3B. Cap 12 and fastener 2 are co-located at the fastener site, with the cap 12 covering the fastener stack 2. The cap 12 and fastener stack 2 may be axisymmetric about an axis of the fastener stack 2 and perpendicular to a local plane of the support structure 30. Hence, the schematic view of FIG. 3B represents a cross-sectional view of the ignition suppression system.

As seen in FIG. 3B, the cap 12 is configured to provide a containment portion that covers the portion of fastener stack 2 that projects above plate 22 (hereinafter "projecting portion"). The cap 12 is configured to define an open volume between the cap 12 and the projecting portion of the fastener stack 2.

In the example depicted in FIG. 3B, the cap 12 includes a base 18 having an opening 34 and a shell 14 having an interior space 32 in fluid communication with the opening 34 in base 18. The shell 14 and base 18 may be integrally formed and made of the same material or may be made of different materials and attached to each other by adhesive bonding, mechanical coupling, etc. The base 18 is in contact with plate 22, is coupled to shape memory attachment element 10, and supports shell 14 in a position such that the interior space of shell 14 is partially occupied by a portion of the fastener stack 2.

In accordance with the embodiment depicted in FIG. 3B, the cap 12 is coupled to shape memory attachment element 10 by placing the cap 12 over the fastener stack 2 and screwing the base 18 of cap 12 onto the shape memory attachment element 10. The base 18 of cap 12 comprises internal threads 9. The internal threads 9 of base 18 are interengaged with the external threads 13 shape memory attachment element 10.

The cap 12 depicted in FIG. 3B is configured to perform an ignition quenching function, such as by having a part or all of the shell 14 made of a porous material. Unlike conventional cap seals, the ignition-quenching covers disclosed herein do not attempt to seal in all of the kinetic and thermal energy of electromagnetic effects at fastener stacks (as might be generated by a lightning strike). Instead, the ignition-quenching covers proposed herein permit gas, liquid, and/or some (non-ballistic) particles to flow through the cap 12 while removing the thermal energy that may ignite a combustible environment such as a fuel mixture in a fuel tank. Hence, ignition sources, ignition events, and/or combustion within the ignition-quenching covers do not propagate outside of the ignition-quenching covers. Additionally, because there is no need for an airtight seal, installation of ignition-quenching covers may be simplified relative to conventional cap seals. Further, the porous structures on the disclosed ignition-quenching covers may save weight and add useable fuel volume relative to conventional cap seals.

The porous elements incorporated in shell 14 permit the combustible environment to permeate into and through the cap 12 and to contact the fastener stack 2. e. The porosity is "open porosity", i.e., the majority of pores are interconnected and not isolated. The porous portions of shell 14 may be configured to prevent, mitigate, and/or suppress one or more aspects of an ignition event triggered (ignited) by an ignition source associated with the fastener stack 2.

More specifically, a porous cap may be configured to prevent formation, propagation, and/or maturation of an ignition kernel therein by dissipating heat energy associated with the ignition source and/or the ignition kernel. An ignition kernel may mature into a self-propagating combustion reaction (e.g., a deflagration wave) when heat energy from the reaction sufficiently heats neighboring combustion reactants (e.g., when energy released is greater than energy losses). The ignition-quenching cover may be configured to dissipate heat energy that may otherwise serve to sustain a combustion reaction. For example, the porous material may have a surface area to pore volume ratio that is high enough to prevent combustion from propagating through the shell 14.

The porous elements of shell 14 may be layered and/or arranged to create pores. Two or more (optionally all) porous elements may have the same characteristics. In some embodiments, at least one of the porous elements has characteristics (e.g., pore size, pore shape, pore orientation, material, etc.) that differ from the characteristics of other porous elements. For example, and as discussed further herein, the shell 14 may be a porous body constructed of sintered polymeric particles (e.g., sintered nylon spheres), forming a network of varied pores.

The cap 12 with porous material forms an ignition-quenching cover which may be configured to prevent the ignition of the combustible environment by preventing a hot particle that is emitted from fastener stack 2 from travelling through the porous body. As used herein, the term "hot particle" refers to a particle that is emitted from the fastener stack 2 and/or due to an ignition source at the fastener stack 2 that has a size and/or a thermal energy sufficient to cause ignition of the combustible environment.

The porous body of cap 12 may be configured such that there are no straight-line trajectories through a pore in the porous body from the interior surface to the exterior surface. If such a straight-line trajectory exists, the size of the pores may be small enough to prevent the traversal of particles having an effective diameter larger than a predetermined size. Particles traversing the ignition-quenching cover along a convoluted (or at least a non-straight) path generally will collide with the porous body in the pores and thereby lose at least a portion of their thermal and/or kinetic energy.

The porous material of cap may be a polymer, a ceramic, a glass, a metal, a non-metal, a composite material, or combinations thereof. Examples of polymers include polypropylene, polystyrene, polyurethane, PEEK, PTFE, polyimide, acetal, PFA, polyamide (e.g., NYLON-brand polymer), polyamide-imide (e.g., TORLON-brand polymer), epoxy, melamine phenolic, polybutylene terephthalate, EVA, polysulfide, and polysulfone. Examples of metals include aluminum, steel, and titanium. Examples of composite materials include filled polymers and fiber reinforced polymers (e.g., carbon-fiber reinforced polymer, fiberglass, and/or LYTEX-brand chopped fiber filled epoxy composite).

Any porous element may be a mass of bonded particles, a mass of sintered particles, a salt-templated polymer, an inverse-cast polymer, a polymeric mesh, a woven or nonwoven polymeric fabric, a polymeric lattice or scrim, or a stochastic open-cell polymeric foam. Pores may also be paths formed in one or two injection-molded parts as disclosed in U.S. Patent Application Publ. Nos. 2020/0080584 and 2020/0080585. If different materials are used, they could be combined in a single layer or stacked in multiple layers.

The porous body may include an exterior coating configured to decrease reactivity of the underlying materials, decrease susceptibility of the underlying materials to the combustible environment, and/or decrease electrical conductivity of the underlying materials. An example of an exterior coating is a parylene conformal coating.

As used herein, the term "salt templated polymer" means an open-porous polymer made by: (1) partially fusing salt granules into an open porous network, (2) infiltrating a polymer precursor solution into some or all of the open spaces in the salt network, (3) curing the polymer, and (4) removing the salt network (e.g. by dissolving in water). As used herein, the term "woven polymer fabric" incudes: (1) a flat woven sheet or a braided tubular material; (2) gauze; and (3) fabric. As used herein, the term "non-woven polymer" includes, e.g., a polymer felt, which may be sandwiched between two layers of polymer meshes or woven polymer fabrics. As used herein, the term "polymer lattice" includes: (1) a lattice or truss structure made via stereolithography (SLA), self-propagating photopolymer waveguides, or other additive manufacturing technique; (2) a polymer lattice with a fuel-compatible coating; (e.g., parylene); (3) a lattice structure with ballistic ignition-resistant architectures, such as integrated features for non-line of sight and complex graded lattice architectures with basal or angled planes. As used herein, the term "inverse cast structure" means an open-porous polymer template made by: (1) SLA, self-propagating photopolymer waveguides, or other additive manufacturing technique, (2) infiltrating a second polymer precursor solution into some or all of the open spaces in the network to cast the structure, (3) curing or drying the polymer, and (4) removing first polymer template through dissolution, etching, or oxidation.

Figure 4A:
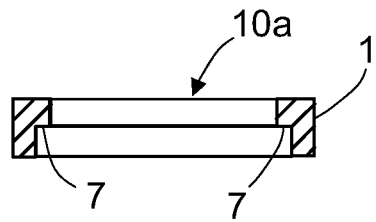
FIG. 4A is a diagram representing a sectional view (with hatching) of a circular ring made of shape memory material and configured to have an offset.
Figure 4B:
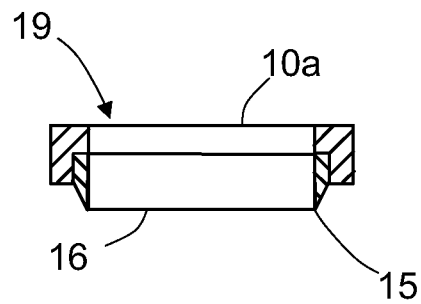
FIG. 4B is a diagram representing a sectional view of an ignition suppression device consisting of a shape memory attachment element of the type depicted in FIG. 4A and a gasket made of thermoplastic material in accordance with a further embodiment.

In accordance with an alternative embodiment, an ignition suppression device includes a shape memory attachment element and a base seal having a knife-edge lip and does not include a cap. FIG. 4A is a diagram representing a sectional view of a shape memory attachment element 10a in the form of a circular ring 1 configured with an offset that forms an inner circumferential seat 7. FIG. 4B is a diagram representing a sectional view of an ignition suppression device 19 consisting of a shape memory attachment element 10a of the type depicted in FIG. 4A and a knife-edge base seal 16 made of thermoplastic material. The knife-edge base seal 16 has a knife-edge lip 15. The knife-edge base seal 16 is seated on the inner circumferential seat 7 with the knife-edge lip 15 projecting (pointing) away from inner circumferential seat 7. (In alternative embodiments, the seat could be in a groove, such as the groove 5 shown in FIG. 2B, instead of seated on an offset against the inner diameter of the SMA ring.) The knife-edge base seal 16 has a circular aperture which is coaxial with the circular aperture of circular ring 1. The diameters of the respective circular apertures may be the same.

Figure 4C:
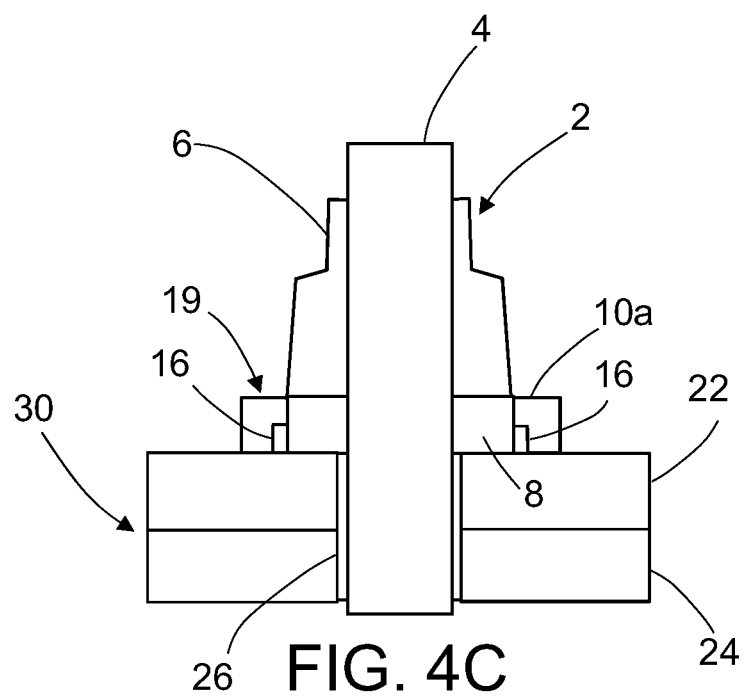
FIG. 4C is a diagram representing a sectional view (without hatching) of the ignition suppression device depicted in FIG. 4B attached to a fastener stack.

FIG. 4C is a diagram representing a sectional view of the ignition suppression device 19 depicted in FIG. 4B attached to a fastener stack 2 by means of the shape memory attachment element 10a. As the shape memory attachment element 10a compresses during the application of a stimulus, knife-edge base seal 16 is deformed to form an airtight seal with the surface of plate 22 while circular ring 1 of shape memory attachment element 10a seals to the fastener stack 2. (The installer may apply an axial force to compress the knife edge axially into the top plate simultaneous with the stimulus compressing the SMA ring radially against the fastener stack.) During service, these seals prevent any EME event under the fastener from emitting energy from between the fastener stack 2 and the plate 22.

Figure 5A:
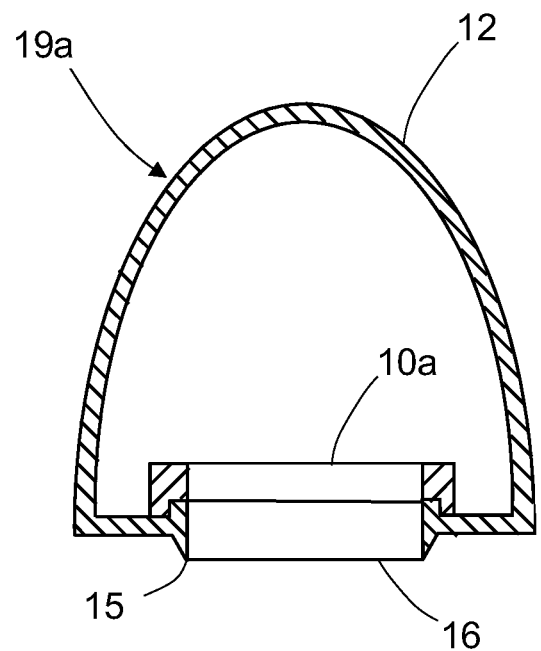
FIG. 5A is a diagram representing a sectional view (with hatching) of an ignition suppression device comprising a non-porous cap with knife-edge base seal in accordance with another embodiment.
Figure 5B:
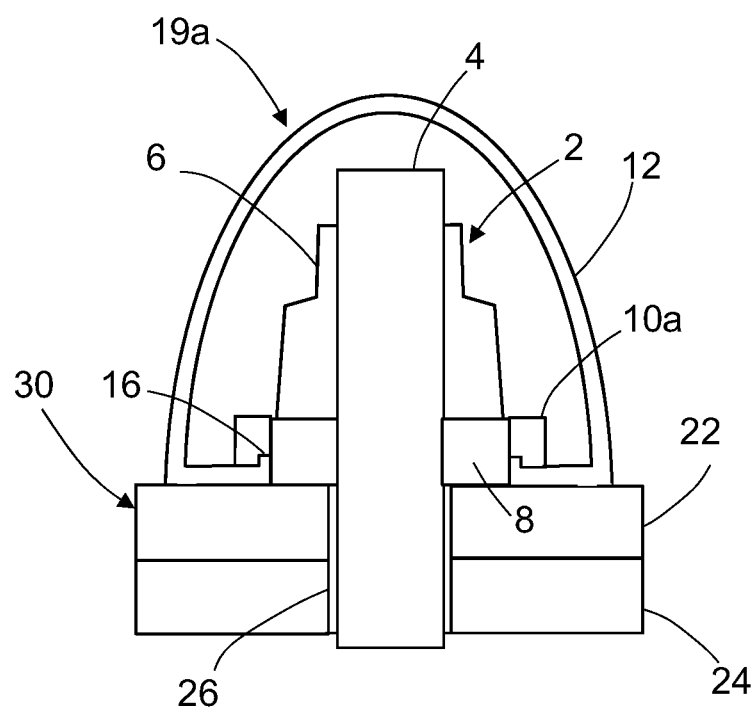
FIG. 5B is a diagram representing a sectional view (without hatching) of the ignition suppression device depicted in FIG. 5A attached to a fastener stack using a shape memory attachment element.

FIG. 5A is a diagram representing a sectional view of an ignition suppression device 19a comprising a non-porous (impermeable to fluids) cap 12 integrally formed with a knife-edge base seal 16 in accordance with another embodiment. As previously described, the knife-edge base seal 16 is seated on the inner circumferential seat 7 of the shape memory attachment element 10a FIG. 5B is a diagram representing a sectional view of the ignition suppression device 19a depicted in FIG. 5A attached to a fastener stack 2 using the shape memory attachment element 10a. The shape memory attachment element 10a, cap 12, and knife-edge base seal 16 (which no longer has a knife edge due to deformation) combine to seal around the entire fastener stack 2 and to the plate 22, thereby containing hot gases and energy (ignition suppression).

Figure 6:
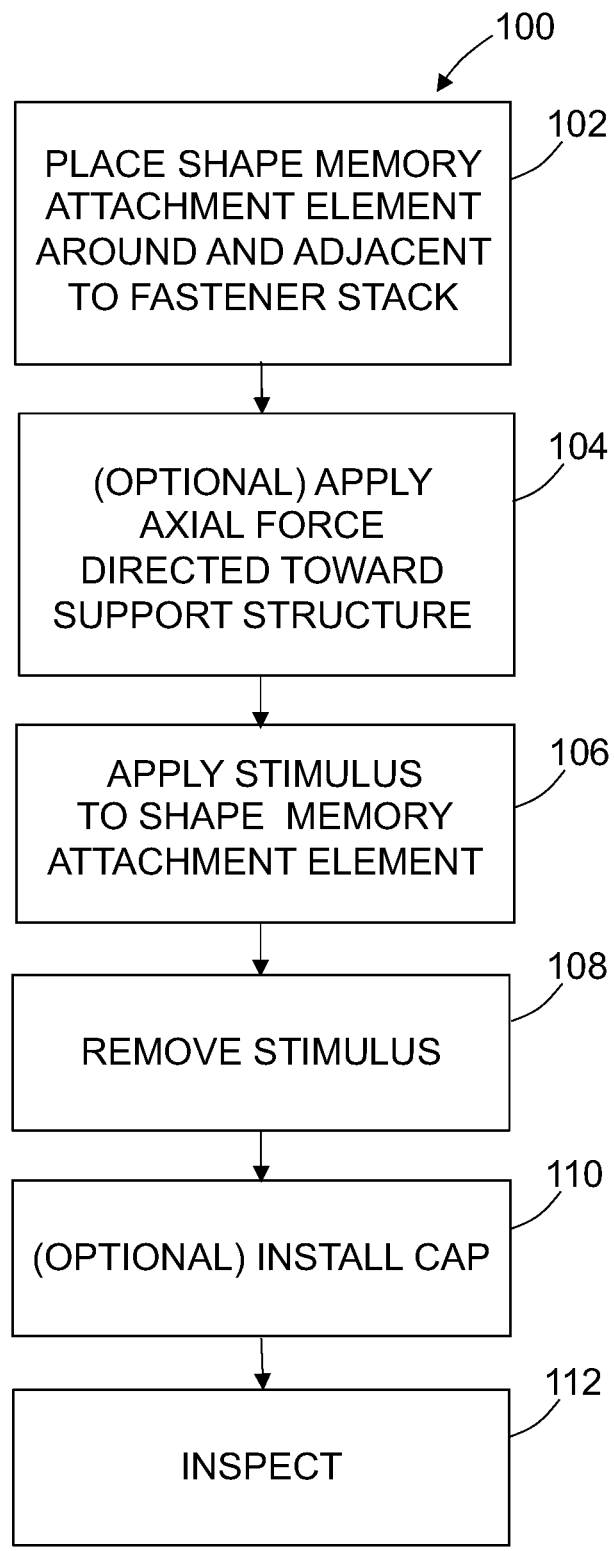
FIG. 6 is a flowchart identifying steps of a method for covering a portion of a fastener stack in accordance with one embodiment.

FIG. 6 is a flowchart identifying steps of a method 100 for covering a portion of a fastener stack 2 in accordance with one embodiment. After a fastener stack has been installed in aligned holes of two or more plates of a support structure, an attachment element made of shape memory material having a first shape is placed so that the attachment element is adjacent to the fastener stack along at least a portion of a periphery of the fastener stack (step 102). Optionally, an axial force is directed toward the support structure (step 104). Then a stimulus is applied that is sufficient to cause the shape memory material in place to transform to a second shape in which the attachment element is compressively attached to the fastener stack (step 106). In accordance with one embodiment, the stimulus is heat. The heat may come from ambient temperature (e.g., if the ignition suppression device is placed over the fastener stack when the ignition suppression device is at a temperature below ambient temperature). The stimulus causes the shape memory attachment element to deform and clamp onto part of the fastener stack. Thereafter, the stimulus is removed along with any axial force being applied (in either order or concurrently)

(step 108). Optionally, a cap is installed by coupling the cap to the shape memory attachment element (step 110). The cap has an interior space that is sized to receive a portion of the fastener stack. In accordance with the various embodiments disclosed above, the cap includes a shell that is either impermeable to fluids or has at least a portion which is porous. In accordance with alternative embodiments, the cap may have a double-shell construction as disclosed in U.S. Patent Application Publ. No. 2020/0080584. The completed installation is then inspected (step 112).

Figure 7A:
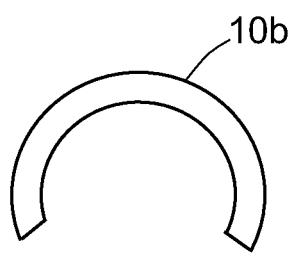
FIGS. 7A and 7B are diagrams representing respective top views of C-shaped and U-shaped shape memory attachment elements.
Figure 7B:
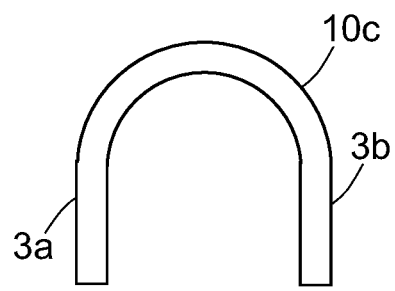

The shape memory attachment element need not be circular. FIG. 7A shows a top view of a pre-stimulus C-shaped shape memory attachment element 10b. FIG. 7B shows a top view of a pre-stimulus U-shaped shape memory attachment element 10c having a pair of parallel legs 3a and 3b. The post-stimulus shape of U-shaped shape memory attachment element 10c may be a circle (or part of a circle) or a smaller U.

The ignition suppression systems and ignition quenching systems disclosed herein may be part of a fuel tank, such as a wing fuel tank in a composite wing aircraft. The fastener stack 2 may be a fastener exposed to the fuel volume and/or ullage (ullage is the space within the fuel tank which is not occupied by fuel) and embedded in and/or coupling one or more plates of a support structure 30 which is exposed to the fuel volume and/or ullage. The support structure 30 may comprise carbon-fiber composite panels, partitions, stringers, etc. that are in the interior of the fuel tank and/or define at least a portion of the interior of the fuel tank. The cap 12 covers the fastener stack 2 and is collocated with the fastener stack 2. The cap 12 may be either porous or non-porous.

The ignition suppression and ignition quenching devices have an attachment element made of shape memory material for attachment to a fastener stack. By configuring a shape memory attachment element to shrink upon application of heat, a radially compressive load can be placed upon a portion of a fastener stack. This can create either a cold-weld or a substantial frictional resistance to keep an ignition suppression or ignition quenching device in place over a fastener stack. Initially, the shape memory attachment element is placed around or partly around a fastener stack. Then a stimulus is applied. In response to the stimulus, the shape memory attachment element attaches to the fastener stack by compression. The remainder of the device (including a cap and a base seal) may be (a) pre-attached to a shape memory attachment element and then the entire device is attached as a unit to the fastener stack; or (b) post-attached to a shape memory attachment element which was previously attached to the fastener stack Although the aircraft wing fuel tank example is detailed to explain some potential advantages of attaching caps to fastener stacks using shape memory attachment elements, the technology proposed herein may be utilized and/or incorporated within other types of structures. For example, caps attached using shape memory attachment elements may be useful in other applications requiring ignition hazard consideration, including fuel transport, fuel storage, mining operations, chemical processing, metal fabrication, power plant construction and operation, and operations which involve combustible particulate such as suspended dust, sawdust, coal, metal, flour, and/or grain.

Thus, the disclosed technology for attaching ignition suppression/quenching devices to fastener stacks is applicable to aerospace companies for lightning protection in commercial and military aircraft, and in other industries wherein ignition protection of tanks containing a flammable gaseous mixture and/or flammable aerosolized mixture may be exposed to lightning strike. Such industries include, but are not limited to, oil and gas, chemical manufacturing/processing plants, and grain storage.

While devices attached to fastener stacks using shape memory material have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore, it is intended that the claims not be limited to the particular embodiments disclosed herein.

In the method claims appended hereto, the alphabetic ordering of steps is for the sole purpose of enabling subsequent short-hand references to antecedent steps and not for the purpose of limiting the scope of the claim to require that the method steps be performed in alphabetic order.

The invention claimed is:

1. A device which is attachable to a fastener stack, the device comprising:
   an attachment element made of shape memory material which is configured to apply a radially compressive load onto a portion of the fastener stack when the shape memory material is stimulated into a state of compression; and
   a cap comprising a base having an opening and a shell having an interior space in fluid communication with the opening, wherein the base is coupled to the attachment element.

2. The device as recited in claim 1, wherein the attachment element comprises a ring.

3. The device as recited in claim 2, wherein the base of the cap comprises a plurality of slots and the attachment element further comprises a plurality of tabs which are respectively seated in the plurality of slots.

4. The device as recited in claim 2, wherein the base of the cap comprises internal threads and the attachment element further comprises external threads which are interengaged with the internal threads of the base of the cap.

5. The device as recited in claim 1, further comprising a base seal.

6. The device as recited in claim 5, wherein the base of the cap further comprises a groove in which the base seal is seated.

7. The device as recited in claim 1, wherein the cap is made of porous material.

8. The device as recited in claim 1, wherein the attachment element in a pre-stimulus state is U-shaped and in a post-stimulus state is circular or arc-shaped.

9. An assembly comprising:
   a fastener stack comprising a fastener and a mating part;
   an attachment element made of shape memory material in a state of radial compression whereby the attachment element is clamped onto a portion of the fastener stack; and
   a cap comprising a base having an opening and a shell having an interior space in fluid communication with the opening,
   wherein the base is coupled to the attachment element and supports the shell in a position such that the interior space of the shell is partially occupied by the portion of the fastener stack.

10. The assembly as recited in claim 9, wherein the portion of the fastener stack onto which the attachment element is clamped is selected from a group consisting of a washer, a nut, a collar, a bolt head, and external projections of a mating portion of a fastener.

11. The assembly as recited in claim 9, further comprising a base seal, wherein the base of the cap further comprises a groove in which the base seal is seated.

12. A method for covering a portion of a fastener stack, the method comprising:
   (a) placing an attachment element made of shape memory material having a first shape so that the attachment element is adjacent to the fastener stack along at least a portion of a periphery of the fastener stack, wherein the shape memory material is configured to apply a radially compressive load onto a portion of the fastener stack when the shape memory material is stimulated into a state of compression;
   (b) applying a stimulus to the shape memory material that is sufficient to cause the shape memory material in place to transform to a second shape in which the attachment element is compressively attached to the fastener stack; and
   (c) attaching a cap to the attachment element, the cap comprising a base having an opening and a shell having an interior space in fluid communication with the opening, wherein the base is coupled to the attachment element and the interior space is sized to receive the portion of the fastener stack.

13. The method as recited in claim 12, wherein step (c) is performed prior to step (a).

14. The method as recited in claim 12, wherein step (c) is performed subsequent to step (b).

15. The method as recited in claim 14, wherein step (c) comprises twist-locking the cap onto the attachment element.

16. The method as recited in claim 14, wherein step (c) comprises the claim threadably coupling the cap to the attachment element.

17. An assembly comprising:
   a plate having a hole;
   a fastener stack comprising a fastener and a mating part;
   an attachment element comprising a ring made of shape memory material in a state of radial compression on a portion of the fastener stack when the shape memory material is stimulated into a state of compression whereby the attachment element is clamped onto the portion of the fastener stack; and
   a base seal made of thermoplastic material which surrounds the portion of the fastener stack and is disposed between the attachment element and the plate.

18. The assembly as recited in claim 17, further comprising a cap which is impermeable to fluids, integrally formed with the base seal, and attached to the attachment element.

19. An assembly comprising:
   first and second plates which are mutually adjacent and have respective holes which are mutually aligned;
   a fastener stack comprising a fastener and a mating part, a portion of the fastener being disposed in the aligned holes;
   an attachment element made of shape memory material in a state of radial compression whereby the attachment element is clamped onto a portion of the fastener stack; and
   a cap comprising a base having an opening and a shell having an interior space in fluid communication with the opening,
   wherein the base is in contact with the first plate, is coupled to the attachment element, and supports the shell in a position such that the interior space of the shell is partially occupied by the portion of the fastener stack.

20. The assembly as recited in claim 19, wherein the portion of the fastener stack onto which the attachment element is clamped is selected from a group consisting of a washer, a nut, a collar, a bolt head, and external projections of a mating portion of a fastener.

21. The assembly as recited in claim 19, further comprising a base seal, wherein the base of the cap further comprises a groove in which the base seal is seated.

22. The assembly as recited in claim 21, wherein the cap is configured to contain fluids.

23. The assembly as recited in claim 19, wherein the cap comprises a porous portion.

\* \* \* \* \*